(12) United States Patent
O'Neal

(10) Patent No.: US 7,028,891 B2
(45) Date of Patent: Apr. 18, 2006

(54) SYSTEM AND METHOD FOR CONFIRMING TRANSACTION OR BILLING COMMUNICATIONS

(75) Inventor: Jonathan O'Neal, Kennesaw, GA (US)

(73) Assignee: e2interactive, Inc., Atlanta, GA (US)

(*) Notice: Subject to any disclaimer, the term of this patent is extended or adjusted under 35 U.S.C. 154(b) by 248 days.

(21) Appl. No.: 10/698,084

(22) Filed: Nov. 3, 2003

(65) Prior Publication Data

US 2005/0060248 A1    Mar. 17, 2005

Related U.S. Application Data

(63) Continuation-in-part of application No. 10/411,971, filed on Apr. 11, 2003, and a continuation-in-part of application No. 10/253,243, filed on Sep. 24, 2002, which is a continuation of application No. 09/641,363, filed on Aug. 18, 2000, now Pat. No. 6,575,361.

(60) Provisional application No. 60/396,404, filed on Jul. 15, 2002, provisional application No. 60/324,333, filed on Sep. 24, 2001, provisional application No. 60/149,740, filed on Aug. 19, 1999.

(51) Int. Cl.
*G06K 5/00* (2006.01)

(52) U.S. Cl. ............... 235/380; 235/382; 235/487; 235/379; 705/14; 705/40; 705/53; 705/58; 705/94; 705/75; 455/408; 455/410; 455/558; 379/114.15

(58) Field of Classification Search ........... 235/380, 235/382, 487, 379; 705/53, 58, 67, 75, 40, 705/14; 455/410, 408, 558; 379/114.15
See application file for complete search history.

(56) References Cited

U.S. PATENT DOCUMENTS

| | | | |
|---|---|---|---|
| 5,577,109 A | 11/1996 | Stimson et al. | |
| 5,903,878 A * | 5/1999 | Talati et al. | 705/40 |
| 5,918,909 A | 7/1999 | Fiala et al. | |
| 6,000,608 A | 12/1999 | Dorf | |
| 6,119,096 A * | 9/2000 | Mann et al. | 705/40 |
| 6,185,545 B1 | 2/2001 | Resnick et al. | |
| 6,189,787 B1 | 2/2001 | Dorf | |
| 6,208,851 B1 | 3/2001 | Hanson | |
| 6,282,566 B1 | 8/2001 | Lee, Jr. et al. | |
| 6,285,749 B1 | 9/2001 | Manto | |
| 6,314,171 B1 | 11/2001 | Dowens | |
| 6,315,206 B1 | 11/2001 | Hansen et al. | |
| 6,333,976 B1 | 12/2001 | Lesley | |
| 6,375,073 B1 | 4/2002 | Aebi et al. | |
| 6,424,706 B1 | 7/2002 | Katz et al. | |
| 6,434,379 B1 | 8/2002 | Despres et al. | |
| 6,445,780 B1 | 9/2002 | Rosset | |
| 6,581,827 B1 | 6/2003 | Welton | |
| 6,588,658 B1 | 7/2003 | Blank | |
| 6,592,035 B1 | 7/2003 | Mandile | |
| 6,675,153 B1 * | 1/2004 | Cook et al. | 705/67 |
| 2002/0077076 A1 | 6/2002 | Suryanarayana et al. | |
| 2002/0100803 A1 * | 8/2002 | Sehr | 235/382 |

(Continued)

*Primary Examiner*—Jared J. Fureman
*Assistant Examiner*—Allyson N Trail
(74) *Attorney, Agent, or Firm*—Hunton & Williams LLP

(57) ABSTRACT

A system and method for confirming transactions is provided. A central processor receives a request to process a current transaction coupled with prior transaction information corresponding to a prior transaction. In response to receiving a prior transaction identifier, the central processor determines whether the prior transaction and the first transaction are identical based on the prior transaction information. If the prior transaction is determined to be different from the first transaction, the central processor amends a first transaction record to indicate that the first transaction is a questionable transaction.

39 Claims, 3 Drawing Sheets

U.S. PATENT DOCUMENTS

| | | |
|---|---|---|
| 2002/0101966 A1 | 8/2002 | Nelson |
| 2002/0115424 A1 | 8/2002 | Bagoren et al. |
| 2002/0119767 A1 | 8/2002 | Fieldhouse et al. |
| 2002/0133457 A1 | 9/2002 | Gerlach et al. |
| 2003/0194988 A1 | 10/2003 | Knox |
| 2004/0039639 A1* | 2/2004 | Walker et al. ............... 705/14 |
| 2004/0218741 A1 | 11/2004 | Welton |
| 2005/0071268 A1* | 3/2005 | Riddett ....................... 705/40 |

* cited by examiner

SYSTEM AND METHOD FOR CONFIRMING TRANSACTION OR BILLING COMMUNICATIONS

CROSS-REFERENCE TO RELATED APPLICATIONS

The invention described herein is a Continuation-In-Part of U.S. application Ser. No. 10/411,971, filed Apr. 11, 2003, which is currently pending. application Ser. No. 10/411,971 is a Continuation of U.S. application Ser. No. 09/641,363 filed on Aug. 18, 2003, now U.S. Pat. No. 6,575,631, which claims priority to U.S. provisional Application No. 60/149,740 filed on Aug. 19, 1999, all of which are incorporated herein by reference. This application is a Continuation-In-Part of U.S. application Ser. No. 10/253,243 filed on Sep. 24, 2002, which is currently pending. application Ser. No. 10/253,243 claims priority to U.S. Provisional Application No. 60/396,404 filed Jul. 15, 2002 and U.S. Provisional Application No. 60/324,333 filed Sep. 24, 2001, all of which are incorporated herein by reference.

FIELD OF THE INVENTION

The present invention is generally related to billing systems. More particularly, the present invention is related to reconciling transaction and billing information in the distribution of PINs and stored-value cards between a plurality of users and a central processor.

BACKGROUND OF THE INVENTION

Sellers charge buyers for the price of goods received by the buyers. Buyers usually will not pay for goods they do not receive, and thus sellers often attempt to confirm that a good was actually delivered to (and/or received by) a buyer before billing the buyer. Among other goals, confirming transactions helps sellers keep accurate billing and accounting records and prevents billing disputes. Thus, sellers have developed a variety of methods to confirm that a buyer has received the relevant goods.

In one common example, a seller's delivery service may require the buyer to sign a receipt indicating delivery and acceptance of the product. Electronic delivery systems, such as those involving communication networks, present unique challenges in confirming the delivery of electronic data. The present invention relates to confirming the delivery of products and services, such as stored-value cards and/or PINs, from a central processor to a user or merchant.

Transactions can be authorized by a central processor, which may deliver the product or service to one or more remote merchant terminals. After a transaction, a party such as the merchant or customer can be billed for the transaction after the transaction is authorized and/or confirmed by the central processor. By way of example, a convenience store merchant may sell a calling card or PIN to a customer. During the sale, the convenience store merchant requests a PIN or calling card authorization code from a central processor over a telephone network. The central station then processes the request and transmits the PIN to the store merchant over the telephone network. The store merchant receives the PIN and delivers it to the customer. Finally, the central station bills the customer or merchant for the price of the PIN.

This example does not include an explicit confirming step. Instead, the central station effectively "confirms" the transaction by virtue of the fact that the central station transmitted the PIN to the merchant terminal. In other words, a merchant is billed because the mere transmission of the PIN by the central processor is sufficient evidence that the PIN must have been received by the merchant terminal (and/or delivered to the customer). It should be appreciated that a PIN can be delivered from a central processor to a merchant terminal to a customer, or directly to a customer. The central processor will bill the customer or the merchant depending on the particular delivery system and the agreements between the various parties.

This simple method can be very efficient when the communication system works properly. However, because errors can sometimes occur, some transactions may never actually be completed. For instance, a PIN may be delivered to a merchant terminal, but the merchant terminal may fail to deliver the PIN to the customer. A merchant employee may request the wrong type of PIN and later cancel the request. Internal and external problems with the merchant terminal, central processor, and/or any communication network between them can cause difficulties in PIN delivery, resulting in a greater need for confirming that a transaction was successfully completed prior to billing. The merchant terminal might not receive a PIN transmitted from the central processor when, for instance, a break in the communication network or a malfunction at the merchant terminal disrupts delivery of the PIN to the merchant or customer. In such cases, the central processor may have no indication that the merchant (or customer) never received a PIN and therefore should not be billed.

A related problem is that a disruption in the communication network may cause a central processor to deem a transaction unsuccessful even though a PIN was successfully delivered to a customer, and the merchant or customer should therefore be billed. Another related issue is identifying the specific PIN transaction to be confirmed when a central processor or merchant terminal handles a series of transactions involving a series of different PINs, or a single transaction with multiple PINs. (In some cases a single transaction with multiple PINs may be functionally similar to multiple transactions with multiple PINs.)

These and other errors may cause a merchant (or central processor or other billing system) to fail to recognize that a transaction was completed even though it received a PIN and delivered it to a customer. Without confirming that a billable event occurred, such as that a PIN or other product was delivered to the proper party, there may be errors in charging purchasers for successful purchases. Largely due to this possibility of errors and the need for accurate accounting records, billing systems typically attempt to confirm that a transaction successfully took place before billing the purchaser.

Various methods have been employed to address the problem of confirming transactions and reconciling billing records. The basic problem is that the central processor must receive confirmation from the merchant terminal that a billable event occurred. In one method, the central processor bills a party only after it receives confirmation from the merchant terminal that a PIN was received at the terminal or that a PIN was delivered to the customer (or other billable event). However, this method has a similar drawback to the simple method: a disruption in a communication, such as the confirmation message, could prevent the central processor from receiving confirmation that the merchant terminal received the PIN (or that the merchant terminal delivered the PIN to the customer). For example, the central processor might successfully deliver a PIN but fail to receive the merchant terminal's message confirming that the billable event occurred. In such a case, the central processor would therefore be unable to determine whether to bill the merchant (or customer, as the case may be).

In an attempt to address these problems, additional verification steps can be added after the billable event occurs. For instance, a more complicated system might require that the merchant release the PIN to a requesting customer (the billable event) only after it receives confirmation that the central processor "knows" the PIN was successfully delivered to the merchant. This method has the following steps: the central processor delivers a PIN; the merchant terminal sends confirmation of receipt; the central processor confirms that it received the merchant's confirmation; the merchant then receives this last confirmation and releases the PIN (the billable event). Naturally, a final confirmation must be sent to the central processor confirming that the billable event occurred.

However, these additional steps do not ultimately solve the underlying problem. A failure to communicate this last step highlights the defect of this method. While the central processor knows that the merchant received the PIN, it does not know whether the billable event occurred. Thus, while the additional steps might provide some useful information, they do not overcome the fundamental problem, and they additionally increase the cost and complexity of the process.

Additional steps in other possible solutions have similar problems. For instance, the merchant terminal may send the central processor a confirmation receipt for a delivered PIN, upon receipt of which the central processor replies with a "confirmation that the confirmation was successfully received," upon receipt of which the merchant terminal will reply back with a "confirmation that the confirmation of the confirmation was successfully received." This time, the billable event is defined to occur when the merchant terminal first receives the PIN. When every message is successfully delivered, both the central processor and the merchant terminal will "know" that a PIN was delivered and a party should be billed. However, if the central processor does not receive the initial confirmation receipt, the central processor still cannot determine whether the merchant terminal received the initial PIN transmission (the billable event).

A related system might condition PIN delivery to the customer (the billable event) upon the successful completion of each of the above steps. While this system will tend to avoid billing customers who never received a PIN, it will fail to bill for successful PIN deliveries (billable events) when errors prevent the central processor from receiving the final confirmation message, namely, a "confirmation that the confirmation of the confirmation was successfully received."

The fundamental problem in any system of this type is sometimes called an "infinite acknowledgement" or "infinite loop" problem because no matter how many times confirmation messages are communicated back and forth between two parties, the first party can never be certain that the second party received the last communication. It should be noted that in these examples, the merchant has exclusive knowledge that a billable event occurred, and the central processor has the PINs and exclusive control over billing. The problem is that the communication from the merchant to the central processor confirming the billable event might fail.

In one of the more efficient billing reconciliation methods used in the art, each current transaction request by a terminal verifies the prior transaction on record at the central processor. The merchant terminal transmits with each new transaction request a prior transaction identifier that identifies the last transaction completed by the terminal, e.g., the last transaction that is deemed by the merchant terminal to be successfully delivered to a customer. When the central processor receives the prior transaction identifier from the merchant, it can then confirm that such transaction was completed, and the appropriate party can be billed. (The central processor also processes the current transaction request, although the current transaction can only be verified during the next transaction request.) Ideally, each prior transaction identifier transmitted by a requesting terminal will match the central processor's last recorded transaction with that requesting terminal. However, because of communication errors, the prior transaction identifier received by the processor will occasionally fail to match the processor's records, such as when the merchant terminal fails to receive a PIN transmitted from the central processor due to an error.

According to this prior art method, at the end of the billing cycle, e.g., at the end of the month, all the transactions that were confirmed by the central processor are billed to the appropriate parties. All the transactions that were not confirmed are then acknowledged as unconfirmed, and action can be taken to investigate whether to bill a party for such transactions. Some questionable transactions may become effectively confirmed when, for example, a customer activates a questionable PIN, thereby indicating that the customer must have received the questionable PIN. Other questionable transactions may require further communication with the merchant, customer, or third parties, or other investigation.

This prior art method could be considered "passive" since data is merely collected during a billing cycle, and billing issues are not considered until the end of the billing cycle. The primary disadvantage of this method is the time delay until the end of the billing cycle. During the passage of time, the information necessary to determine whether a given transaction occurred may disappear or fade, leading to increasingly inaccurate billing records and increasingly costly reconciliation efforts. Further, delays in billing cause a loss in the time value of money since delayed bills may result in delayed payments.

What is needed is a billing reconciliation system and method that efficiently confirms transactions with a minimum of cost and complexity. What is further needed is a billing reconciliation system and method that determines the confirmation status of transactions in a prompt manner.

BRIEF SUMMARY OF THE INVENTION

Generally speaking, the foregoing needs are fulfilled by providing in one exemplary embodiment a method for confirming transactions. A central processor receives a request to process a current transaction coupled with prior transaction information corresponding to a prior transaction. In response to receiving a prior transaction identifier, the central processor determines whether the prior transaction and the first transaction are identical based on the prior transaction information. If the prior transaction is determined to be different from the first transaction, the central processor amends a first transaction record to indicate that the first transaction is a questionable transaction.

According to another embodiment of the invention, a computer-readable medium encoded with computer program code for reconciling billing requests is provided wherein the program code causes a computer to execute a method of reconciling transaction information. A system and method for confirming transactions is provided. A central processor receives a request to process a current transaction coupled with prior transaction information corresponding to a prior transaction. In response to receiving a prior transaction identifier, the central processor determines whether the prior transaction and the first transaction are identical based on the prior transaction information. If the prior transaction is determined to be different from the first transaction, the central processor amends a first transaction record to indicate that the first transaction is a questionable transaction.

In another embodiment of the invention, a system is provided for confirming transactions processed at a central processor. A remote terminal is configured to transmit transaction requests and transaction information to a central processor. A central processor is configured to receive transaction information and transaction requests from the remote terminal. In response to receiving transaction information, the central processor is further configured to determine whether transaction information received from the remote terminal corresponds to the last transaction for which a transaction identifier was transmitted to the remote terminal and amend one or more stored transaction records if the transaction information received from the remote terminal does not correspond to the last transaction for which a transaction identifier was transmitted to the remote terminal.

Other embodiments could be considered.

Figure 1:
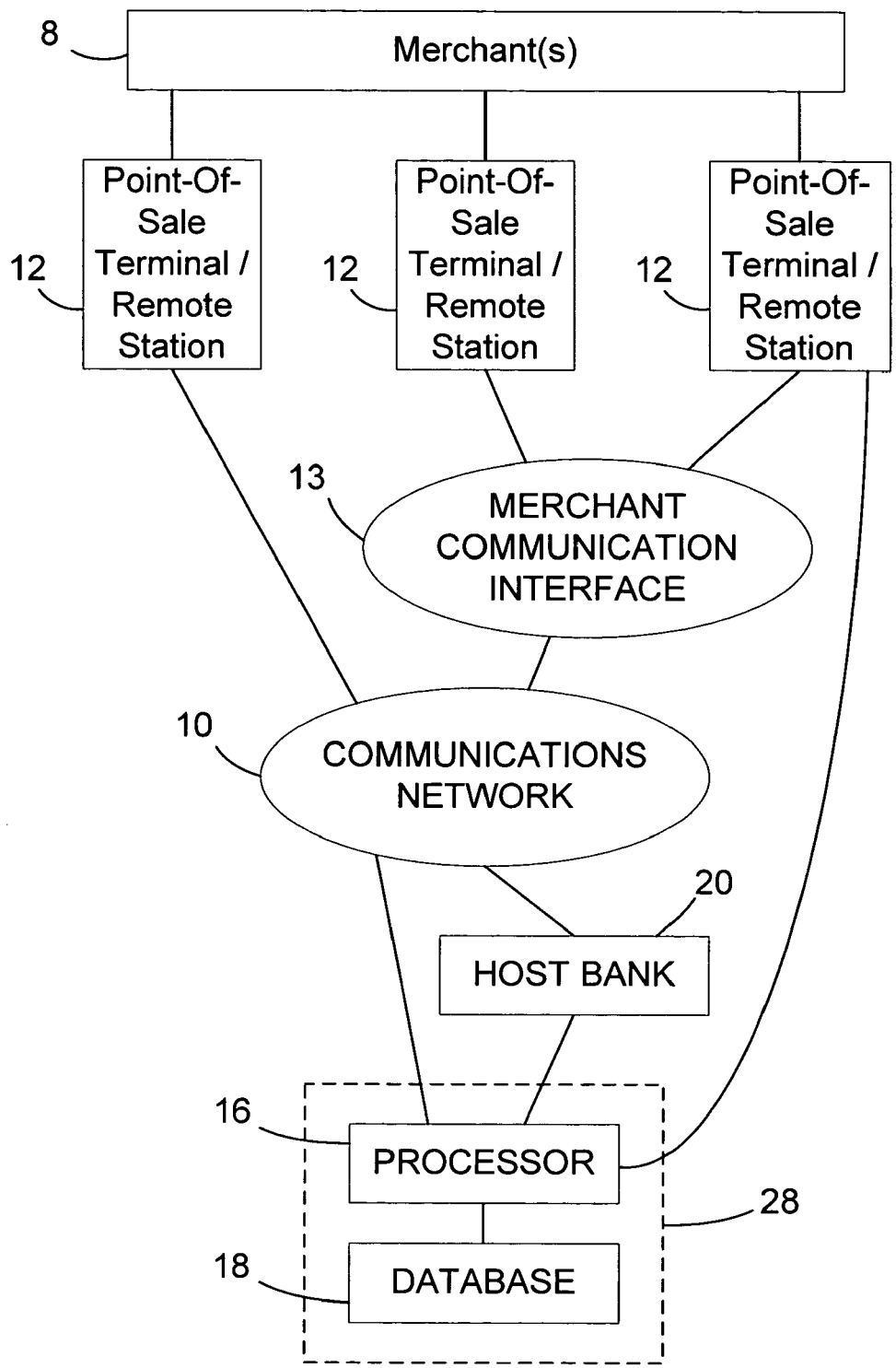
FIG. 1 illustrates a schematic block diagram showing how merchant terminals may be connected via a communication network to a central data management system embodying the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 illustrates a schematic block diagram showing how merchant terminals may be connected via a communication network to a central data management system embodying the present invention. The system comprises one or more merchants 8, remote merchant point-of-sale terminals 12 each associated with one or more merchants 8, an optional merchant communication interface 13, an optional communications network 10, an optional host bank 20, and a central processor 28 comprising a processor 16 and a database 18 coupled to the processor 16.

One or more stored-value card merchants may comprise one or more point-of-sale terminals 12. The remote terminals 12 can be any terminal as disclosed in this or the related applications. For instance, the remote terminals 12 may comprise an input device that reads credit card information. The terminal 12 may also comprise an ATM machine, or any other computer or terminal that can receive customer and/or merchant input information. The remote terminals 12 may be configured to process transactions. The transactions may occur over the communication network 10. Delivery and confirmation of the transaction may occur over the same or a different communication network 10. The remote terminals 12 may connect to a merchant communication interface 13. The merchant communication interface 13 may comprise any transmitter, receiver, router, or other intermediate communication device. The merchant communication interface 13 may connect to a communication network 10. Alternately, the remote terminals 12 may directly connect to the communication network 10 and/or the central processor 28.

The communication network 10 can comprise any communication network. Examples of communication networks 10 include dedicated telephone lines, public switched telephone networks (such as those that provide automatic number identification (ANI)), the internet (such as wherein the point-of-sale terminals have identifiable IP addresses), any other computer network such as a WAN or LAN, and any other networked communication. The communication network 10 may be connected to a host bank 20, or alternately it can connect directly with the central processor 28.

The transactions may involve the purchase of stored-value cards, PINs, or any other product or service, preferably products and services associated with a PIN or other code that can be delivered electronically from the central processor 28 to the merchant terminal 12. The transactions may include the sale of a PIN and/or the sale of a prepaid service that may be accommodated by a stored-value card, such as long distance telephone communication, wireless communication, paging and internet-enabled communication services, including wireless web access. Other examples of prepaid services and/or products that may be accommodated by the transaction include gift cards, prepaid gas cards, prepaid grocery cards, prepaid entertainment cards, downloadable ring tone cards, downloadable game cards, downloadable music cards that use MP3, MP4, WMV, WAV, or other music formats, any other downloadable software card, customer rewards cards, and any other type of stored-value cards for products, services, or both, that may be prepaid by the owner of the card.

Prepaid long distance phone cards, a type of stored-value card, are generally used in the telephone industry to allow customers to pre-purchase long distance calling time. Each of the cards has a printed identification number. Identification information associated with the card can be magnetically stored therein or printed on a barcode. The identification number is also stored in a file in a database maintained by the card issuer, such as database 18. In the traditional business model, when the cards are sent to the retail location from which they will be sold, the corresponding records in the database are activated, thus allowing the card to be used immediately by a customer. To use the card as a prepaid long distance card, the customer dials a toll free number to access the card issuer's system, enters the identification number, and then makes the desired long-distance call.

The system of FIG. 1 (and also FIG. 2) may be used to confirm transactions as follows, and also as described with respect to FIGS. 2 and 3. The system is configured to confirm any number of successive transactions through an iterative process.

The central processor 28 may store information relating to a first transaction at the database 18. The merchant terminal may also be configured to store transaction information, such as identification information for past transactions, which may comprise transaction numbers or PINs.

The first transaction may correspond to the most recent transaction wherein the central processor 28 transmitted a transaction identifier to the particular remote station 12, e.g., a PIN to be distributed to an end user. During the course of the first transaction, the central processor 28 transmits the PIN or other product or code to a remote terminal 12. At this point, the central processor 28 has not yet verified with the remote terminal 12 whether the remote terminal 12 actually delivered the PIN to an end user.

The verification process begins when the remote terminal 12 transmits to the central processor 28 a request for a new transaction identifier. The transmission may be directly to the central processor 28 or via the merchant communication interface 13 and/or the communication network 10. Such request may also be routed through the host bank 20 affiliated with the central processor 28 or remote terminals 12. The remote terminal 12 transmits with the request the transaction identifier for the last successful transaction successfully completed at the remote terminal 12. A record of the last successful transaction (and/or any number of prior transactions) may be stored at a database coupled to the terminal 12.

When there are no errors or equipment failures, the central processor 28 should receive from the remote station 12 a transaction identifier that matches the central processor's first transaction. In such a case, the central processor 28 can verify that the merchant associated with the remote terminal should be billed a certain amount according to the transaction. Such verification might occur, for example, by checking that the record of the first transaction stored at the database 18 matches the identifier received from the remote station 12. The verification may occur in response to the central processor 28 receiving the identifier. It may occur immediately, or it may occur at another time before the end of a billing cycle or other event, such as a subsequent transaction request. In a preferred embodiment, verification occurs during the present transaction.

While the remote station's 12 last successful transaction ought to correspond to the processor's 16 last successfully transmitted transaction identifier (i.e., the first transaction identifier), errors may cause discrepancies. When the last successful transaction of the remote station 12 does not match the last successful transaction of the processor 16 (e.g., the last transaction for which an entry was recorded in the database 18), then the central processor 28 alters the stored record of the first transaction to indicate that it is a questionable transaction, i.e., that the transaction was not necessarily completed successfully and there may have been an error. In other words, the processor 16 recognizes that the remote station may have failed to complete the last transaction. A variety of errors in the system may cause such a discrepancy. On the other hand, although the transaction is determined to be questionable, it is possible that the transaction was nevertheless completed successfully. Some investigation may be required to reconcile the true status of the transaction and/or the cause of the error or discrepancy. In a preferred embodiment, altering the stored record occurs prior to a subsequent transaction and in response to receiving the identifier and determining whether the transactions match.

At this point, the transaction is determined by the processor 16 to be questionable, and active steps can be taken to determine whether the transaction was completed. For instance, the central processor 28 (or a party associated with the central processor 28, such as a financial institution or company) may contact the merchant terminal 12 (or a party associated with the merchant terminal 12, such as a merchant 8 or merchant employee) to request confirmation that the questionable transaction was successful. Some merchants 8 and/or terminals 12 may store electronic or hard-copy records of all successful (and unsuccessful) transactions, thereby facilitating the confirmation process. For instance, the central processor 28 may electronically request that a merchant terminal computer 12 transmit back to the central processor 28 a list of the most recent successful transaction identifier(s). Information passed between the merchant terminal 12 and the central processor 28 may include any information regarding prior transactions, such as records of failed transactions or corrupted PINs or other products or identifiers.

The status of a questionable transaction may also be confirmed by the actions of third parties. For instance, if the transaction was the distribution of a PIN to an end user, then the activation of the PIN by the end user can signal to the processor 16 that the transaction must have been consummated. After such supplemental transaction confirmation, the merchant 8 or other appropriate party could be billed even though the PIN was the subject of a questionable transaction.

Under this method, several transactions might be deemed to be questionable at any given time. For instance, if the central processor 28 delivers PINs with transactions #1–5 to a remote terminal 12, but the remote terminal 12 sends confirmations for only transactions #1 and #5, then the central processor 28 will "flag" transactions #2–4 as being questionable. For example, if the last verified transaction before transaction #5 was transaction #1, then transactions #2–4 will be immediately marked as questionable since they have not been verified.

To prevent the unauthorized distribution of PINs, the system may have security protocols for determining whether to process a request from a merchant terminal 12. The communication network 10 may be a known and/or trusted carrier of PIN requests, such as a dedicated data line, wherein the central processor 28 recognizes that a request for a PIN received via the trusted communication network 10 must be from a merchant terminal authorized to make PIN requests. Alternately, the merchant terminals 12 themselves may be trusted sources. For instance, trusted sources of requests may comprise merchant terminals 12 on a dedicated data line, merchant terminals 12 at a particular or identified phone number on a public switched telephone network, and merchant terminals 12 at a particular or identified internet IP address. The central processor may store records identifying the trusted sources and/or trusted communication networks, and it may process any request that is identified to be from a trusted source (or via a trusted communication network 10). A source may be identified by its phone number or internet IP address, for example. The merchant terminal may also become a trusted source by transmitting a proper PIN or password to the central processor.

Figure 2:
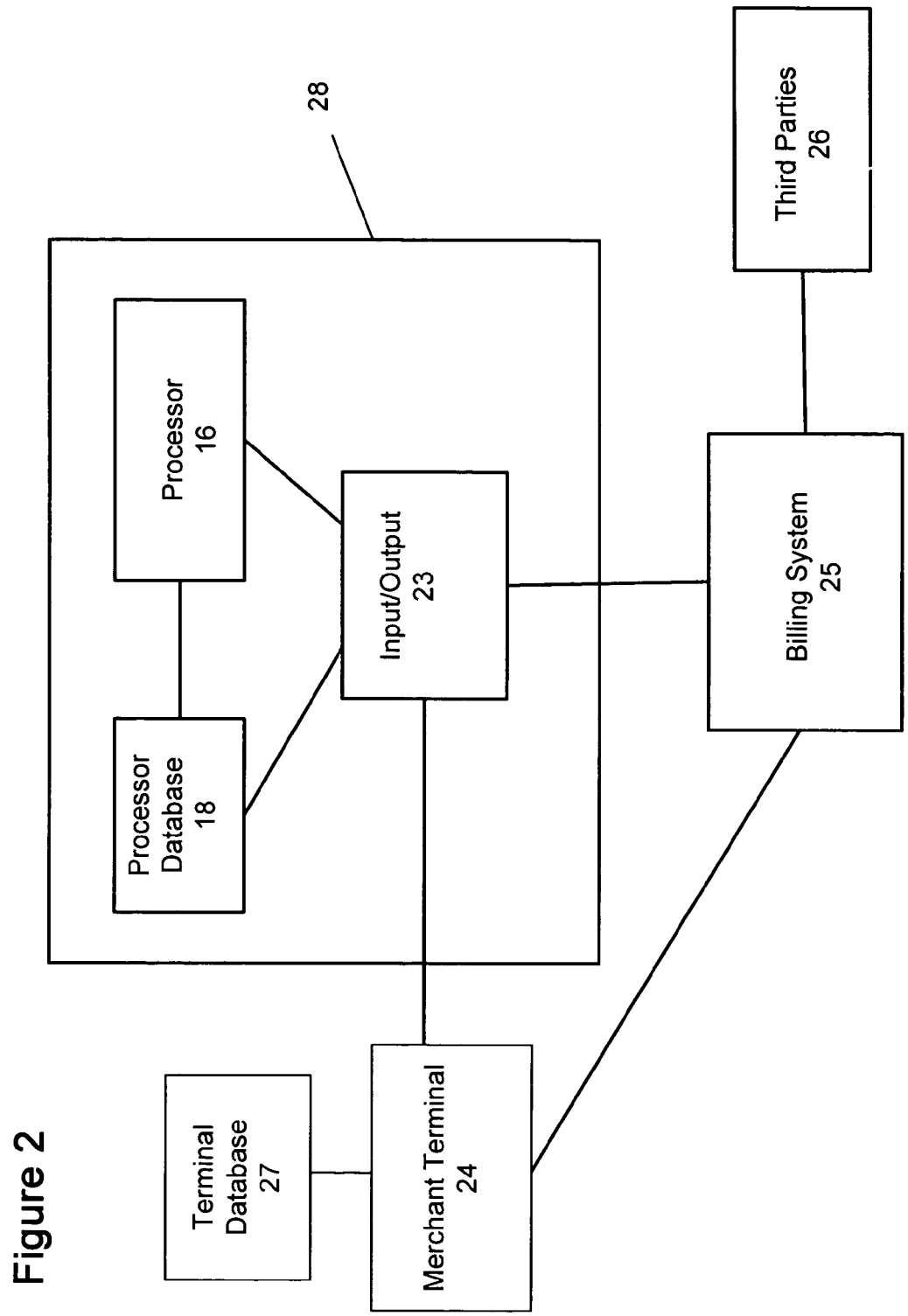
FIG. 2 illustrates a schematic block diagram showing how the processor, input/output device, and database may be interconnected with a merchant terminal in accordance with the present invention.

FIG. 2 illustrates a schematic block diagram showing how the processor, input/output device, and database may be interconnected with a merchant terminal in accordance with the present invention. An input/output device 23 is operatively connected to a database/memory 18, a processor 16, a merchant terminal 12, and a billing system 25. The input/output device transmits and receives transaction identifier information. The database 18 stores transaction-related information, such as transaction identifier information. The processor 16 communicates with the merchant terminal 12 and the billing system 25 via the input/output device 23.

The system of FIG. 2 comprises a central processor 28, a billing system 25, third parties 26, a merchant terminal 12, and a terminal database 27 coupled to the terminal 12. The central processor 28 comprises a processor 16, a processor database 18 coupled to the processor 16, and an input/output device 23 coupled to the database 18 and processor 16. The database 18 may store information regarding transactions, including transactions that have not yet been confirmed. As described herein, the system is configured to process and confirm transactions.

In the transactions contemplated herein, a customer may request or purchase any type of product or service, such as those associated with a PIN. For instance, the customer may request a stored value card, such as a phone card, wherein the delivered PIN activates or enables the card. The customer may customize the request by selecting a stored-value amount, such as $20 or $50, and selecting a carrier or brand, such as AT&T or MCI. Other selections can be made. The requested PIN may also correspond to downloadable content, such as software. For instance, the customer may request a specific software product, such as a downloadable ring tone or music files, and the delivered PIN may be used to enable the download any time after PIN delivery.

The merchant terminal 12 transmits a transaction request to the central processor 28 via the input/output device 23, which passes it to the processor 16. Included with the transaction request is an identifier corresponding to the remote terminal's 12 last acknowledged transaction, which may be stored in the terminal database 27 and passed from the database 27 to the terminal 12. The processor 16 compares that information with transaction information stored at the processor database 18 pertaining to the last PIN (or other identifier, product, or service) delivered to the particular remote station 12. If the two transactions match, then the billing records are reconciled and the central processor 28 may cause the appropriate parties to be billed, such as by transmitting billing information to the billing system 25. The billing system 25 can bill the merchant associated with the merchant terminal 12.

If the two transactions do not match, then at least one of the records stored at the database 18 will be immediately flagged as "questionable", and more active steps can be taken by the processor 16 and/or the billing system 25 to ascertain whether such questionable transactions can be billed. For instance, the billing system 25 can communicate directly with the merchant terminal 12 as well as third parties 26 to ascertain whether the PIN or other product was actually delivered to either the merchant terminal 12 or end user. For instance, the billing system 25 might contact third parties 26 such as the billing office of the phone company that handles the activation of the PINs (or other products or services) that are the subject of the questionable transactions. For instance, if the product is a phone card activated through a delivered PIN, the billing system 25 may communicate with a third party telecommunications carrier 26 to determine whether the questionable PIN has been activated.

Figure 3:
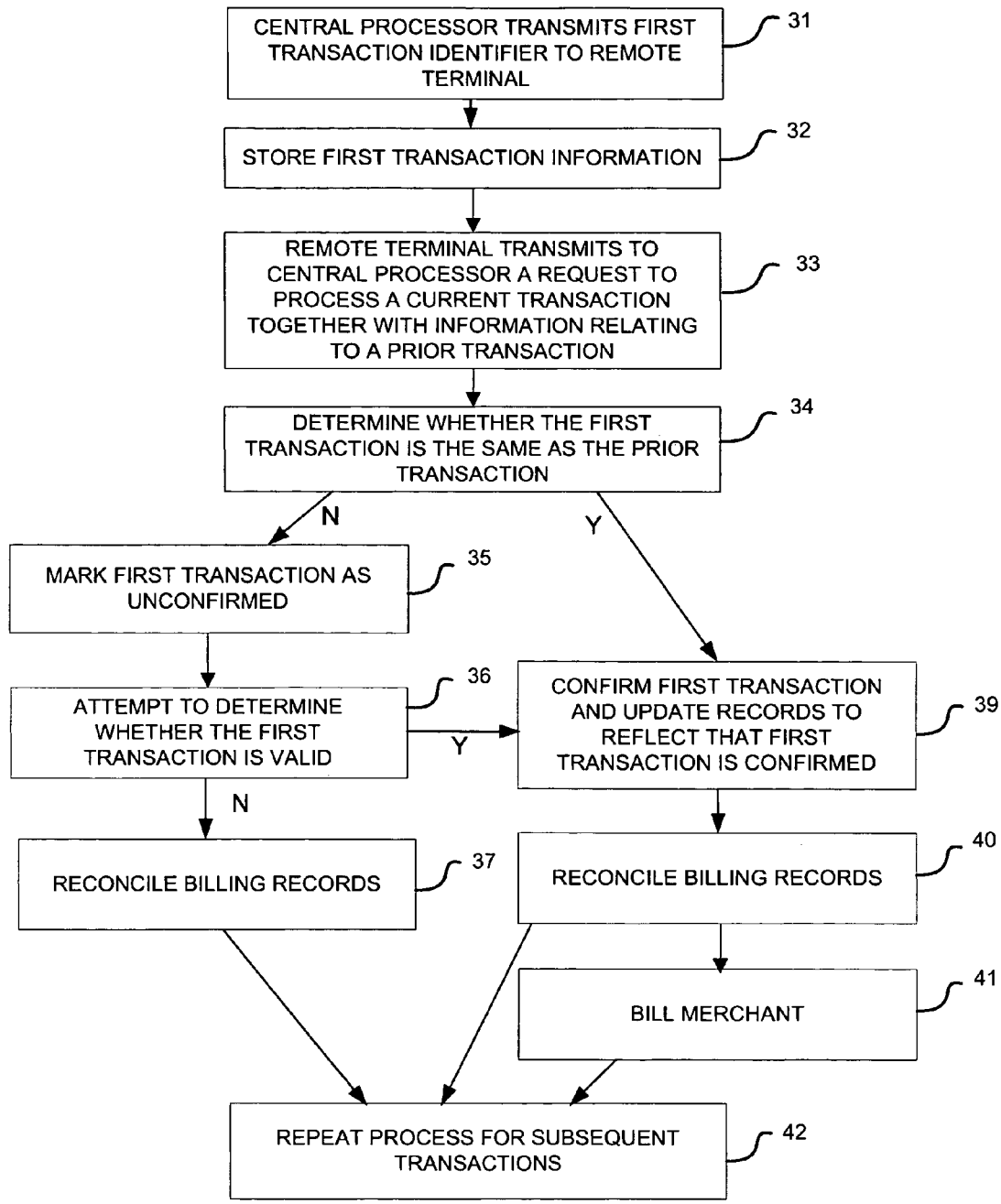
FIG. 3 is an exemplary flow chart illustrating one aspect of the present invention as may be implemented by the system of FIGS. 1 & 2.

FIG. 3 is an exemplary flow chart illustrating one aspect of the present invention as may be implemented by the system of FIGS. 1 & 2. Through the process of FIG. 3, a central processor confirms whether a transaction was completed at a remote terminal by verifying whether a prior transaction identifier received from a remote terminal in a subsequent transaction request corresponds to a prior transaction identifier stored at the central processor. For purposes of explanation, the transaction identifier received from the merchant may correspond to Transaction A, and the most recent transaction identifier stored at the central processor may correspond to Transaction B. If there are no errors, the identifier received from the merchant should correspond to the most recent stored identifier, and Transaction A should be the same as Transaction B. This process can repeat any number of times for confirming successive transactions. Each subsequent transaction request may include a prior transaction identifier for confirming a prior transaction.

In step 31 of FIG. 3, the central processor transmits to a remote terminal a first transaction identifier. For purposes of demonstration, the first transaction identifier may correspond to Transaction A. The first transaction identifier, for example "A1," may be transmitted by the central processor along with a corresponding first transaction PIN (or other product or service) in response to a request for a PIN from the remote terminal. The request may be initially made by a customer at the remote terminal during a first transaction. The identifier is transmitted together with the PIN for purposes of later identifying the first transaction and confirming that it was successfully completed, as described below.

A transaction identifier may comprise a PIN or any other identification number or code. A PIN could be a password or other number or code. For instance, a customer may request a PIN (or product associated with a PIN) from a merchant. The merchant may then request a PIN from the central processor through the remote terminal. The central processor may then transmit the PIN and a transaction identifier (such as "A1") identifying the PIN transaction, according to step 31. The first transaction identifier may be any form of identification, such as a unique number associated with the transaction or the PIN itself. At this point in the process, the central processor has no information regarding whether the remote terminal has successfully received the first transaction identifier (or the PIN), nor does it know whether the PIN was delivered to a customer.

In step 32, the first transaction identifier (such as "A1") is stored. It may be stored at any storage location, such as a database at the merchant terminal. The PIN may also be stored. The database may store the identifier (and PIN, optionally) for each of the terminal's transactions. Storing such information may be useful for later reconciling records between the terminal and the central processor. The storage location may have a limited memory such that only a certain number of identifiers can be stored before each new identifier causes a prior identifier to be erased. In one embodiment, first transaction information other than the first transaction identifier is stored. For instance, a portion of the identifier may be stored, or the PIN may be stored instead of the identifier. Regardless, the stored information is specifically associated with the first transaction and can be used to specifically identify the first transaction. For instance, the information may comprise date and time information regarding the time that a request was made.

In step 33, the remote terminal transmits to the central processor a request to process a current transaction (Transaction C) together with information relating to the most recent prior transaction that was successfully received at (and/or delivered to a customer by) the remote terminal (Transaction B). The prior transaction information is transmitted to the central processor in order to confirm that the prior transaction was successfully completed at the remote terminal. Absent errors, the merchant terminal's most recent successful transaction (Transaction B) should also be the most recent transaction for which an identifier was recorded at the central processor (Transaction A). The prior transaction information is also preferably stored at the merchant terminal or a database connected to it. The central processor should receive the transmitted information.

In a preferred embodiment, the transmitted information relating to a prior transaction is the prior transaction identifier (such as an identifier originally received from the central processor), such as "B1," but it could be any information specifically associated with a prior transaction that can be used to specifically identify the prior transaction.

This step contemplates the possibility that the remote terminal never received the first transaction identifier (or the first PIN), or that some other communication or transaction error may have occurred. When an error occurs that prevents the remote terminal from successfully receiving the first transaction identifier (or otherwise completing the transaction), then the identifier would not be stored. If this is the case, then the remote terminal's prior transaction identifier may correspond to a transaction prior to the first transaction, and Transaction A may not be identical to Transaction B; similarly, their identifiers may not be the same.

In step 34, the processor determines whether the first transaction (Transaction B) is the same as the prior transaction (Transaction A). As described above, the processor uses the database to verify that the remote station's latest recorded transaction is the same as the processor's latest recorded transaction. In a preferred embodiment, this step may comprise comparing a first transaction identifier (A1) with a prior transaction identifier (B1) to determine whether they are the same. This step 34 may occur immediately after receiving the information from the remote terminal, or it may occur before the end of a billing cycle or other event, such as the next transaction request from the remote terminal. In a preferred embodiment, the determining step 34 occurs in response to receiving the identifier from the remote terminal.

If they are the same (A1 equals B1), then in step 39 the first transaction is confirmed and records are updated to reflect that the first transaction is confirmed. Confirming a transaction may comprise amending stored transaction information (such as the stored transaction identifier or record) to reflect that the transaction has been confirmed. It may also comprise sending transaction information to another party or database reflecting that the transaction is confirmed. This step 35 may occur immediately after receiving the information from the remote terminal, or it may occur before the end of a billing cycle or other event, such as the next transaction request from the remote terminal. In a preferred embodiment, the confirming and updating step 39 occurs in response to receiving the identifier from the remote terminal and/or in response to the determining step 34.

The billing records are reconciled in step 40. Reconciling billing records may comprise comparing the billing or transaction records of one database with transaction information (such as identifiers) of another. Billing records may be stored at the central processor and/or another database. In a preferred embodiment, the billing records are separate from a list of confirmed transactions stored at the central processor, and this step comprises comparing and/or amending the two data sets. In another embodiment, the billing records are identical to the records updated in step 39. In this embodiment, step 39 also completes step 40. This step 40 may occur immediately after receiving the information from the remote terminal, or it may occur before the end of a billing cycle or other event, such as the next transaction request from the remote terminal. In a preferred embodiment, the confirming and updating step 35 occurs in response to receiving the identifier from the remote terminal and/or in response to the confirming and updating step 39.

If the transaction was confirmed, then the appropriate party is billed in step 41. The appropriate party may be the merchant who received and/or distributed the PIN or other product or service. The appropriate party may also be a customer, such as a customer who activates the PIN through the central processor or a third party. The billing step 41 may be any billing method used by merchants, banks, and/or PIN distributors, such as invoicing a merchant or charging a customer's credit card. The billing may not occur immediately after the transaction, but instead may occur at the end of a month or other billing cycle. The billing may also occur before the billing records are reconciled.

On the other hand, if the central processor receives a transaction identifier that is not identical to the prior transaction identifier (i.e., A1 does not equal B1), then the processor will immediately mark any unconfirmed transactions as questionable in step 35. Unconfirmed transactions may include transactions through a particular remote terminal that have not yet been confirmed by that terminal (other than the current transaction, which would not be confirmed until a subsequent transaction request).

The step of marking a transaction as questionable 35 may occur in a variety of ways. For instance, the step 35 may comprise amending its identifier (or record or entry) stored in the database, deleting its identifier, moving the identifier from one database to another, communicating information about the questionable transaction to a central billing system or another entity (such as via email), sending the PIN(s) correlated to any questionable transaction to a database, deleting the questionable PINs, or any other method of distinguishing the questionable entries from the confirmed (and current) entries, by any act or omission.

In one embodiment, transaction records are "marked" only when they are confirmed. Since questionable transactions have not been marked confirmed, they can still be identified because they are the only processed transactions that have not been confirmed. In this sense, the question After step 35, an attempt may be made to determine whether the questionable transaction(s) is valid in step 36. As mentioned above, a merchant or third party related to the billing function or otherwise related to the specific questionable transaction(s) can be contacted to determine if any further information exists about whether a given transaction was completed. If the transaction is ultimately confirmed, then the flow chart proceeds to steps 39–41.

If a transaction is not confirmed, then other action may eventually be taken. For instance, the transaction or PIN may eventually be cancelled or invalidated, and no party will be billed. Alternately, the transaction or PIN may be marked as "questionable" for an indeterminate amount of time. The billing records are reconciled in step 37 to reflect that the transaction has been identified as questionable. In one embodiment, this step may comprise comparing or communicating the records (or a portion of the records) of a database in the central processor with a database at a financial institution or another company responsible for billing inquiries or other financial matters. Alternately, other apparatus at the central processor may be responsible for billing, or the central processor itself may keep the billing records, and the central processor can handle the billing reconciliation.

After the process has proceeded through the flow chart of FIG. 3 through any of the scenarios described above, the process can repeat for any number of successive transactions in step 42. These successive transactions may correspond to subsequent requests for PINs and deliveries of the PINs to the remote terminal. The whole process of FIG. 3 would begin again, for instance, when the central processor delivers to the remote terminal a transaction identifier (and PIN) for the current transaction, which was requested by the terminal in step 33. The process of delivering the identifier and PIN would proceed in the manner described above for step 31. Basically, the process would follow the entire process shown in FIG. 3, starting from the beginning, except that the labels of the transactions ("current," "first," "prior") would change. For example, the "current" transaction of step 33 would become the "first" transaction for the next iteration of the process of FIG. 3.

The following example is provided to further illustrate the process of FIG. 3. The central processor delivers PINs to Remote Terminal #ABC in transactions associated with transaction identifiers ID1, ID2, ID3, and ID4. The transaction corresponding to identifier ID1 proceeds without error according to the process described above for FIG. 3, and this transaction becomes the most recent successful transaction for both the central processor and Terminal #ABC. Identifier ID1 is stored at both the central processor database and Terminal #ABC's database. In the next transaction, which corresponds to ID2, Terminal #ABC submits a request for a PIN associated with identifier ID2 and accordingly submits the identifier of its last recorded transaction, ID1. The central processor properly confirms the transaction corresponding to ID1, which is the most recent transaction for which a PIN and identifier was successfully delivered from the central processor to Terminal #ABC. The central processor transmits the identifier ID2 as well as its associated PIN, and it stores a record of ID2. Terminal #ABC fails to receive identifier ID2 due to a communication error, and it requests another PIN in a transaction associated with identifier ID3. It submits with this request the identifier corresponding to its last recorded transaction (which is ID1 rather than ID2 because ID2 was never received). The central processor compares the submitted identifier, ID1, with the central processor's last recorded identifier, ID2. It determines that they are not the same, and thus the central processor marks the transaction associated with ID2 as questionable. The central processor transmits identifier ID3 and its associated PIN to Terminal #ABC, and it stores a record of ID3. Terminal #ABC receives ID3 but not its associated PIN, due to an error. Terminal #ABC then requests a PIN in a transaction corresponding to ID4. It accordingly submits identifier ID1 with the request, since it is the identifier corresponding to the last transaction where a PIN was successfully received at Terminal #ABC. The central processor compares submitted ID1 to recorded ID3, determines that they are not identical, and therefore marks ID3 as questionable (and also possibly 1D2). The central processor transmits ID4 and its associated PIN to Terminal #ABC, and it stores a record of ID4. Terminal #ABC successfully receives the transmission. Terminal #ABC requests a PIN in a transaction corresponding to ID5 and accordingly submits identifier ID4, its last recorded identifier. The central processor determines that its most recent transaction matches with Terminal ABC's most recent transaction, and the transaction associated with ID4 is confirmed.

As described above, this iterative process contemplates the possibility that the terminal never receives the PIN requested in step 33, i.e., the "current transaction" PIN. In such a case, during the first subsequent transaction of step 42 the "prior transaction identifier" that is transmitted by the remote terminal with the PIN request will not match the central processor's records of the most recent transaction (namely, the "current transaction" of step 33). The "current transaction" would then be marked as a questionable transaction as described in step 35.

A successive transaction 42 may occur before billing records are updated in step 40 and before a party is billed in step 41. Transactions may occur multiple times in one day at a merchant terminal, while billing may be once a month for all the confirmed transactions occurring during that month.

It will be understood that the specific embodiment of the invention shown and described herein is exemplary only. Numerous variations, changes, substitutions and equivalents will now occur to those skilled in the art without departing from the spirit and scope of the present invention. In particular, the terms used in this application should be read broadly in light of the similar terms used in the related applications. For instance, the point-of-sale terminals 12 may be any kind of terminal as disclosed in the related applications, and the central processor 28 may be any kind of processor as disclosed in the related applications. Accordingly, it is intended that all subject matter described herein and shown in the accompanying drawings be regarded as illustrative only and not in a limiting sense and that the scope of the invention be solely determined by the appended claims.

The invention claimed is:

1. A method for reconciling billing information, comprising:
   receiving at a central processor a request to process a current transaction coupled with a prior transaction identifier corresponding to a prior transaction;
   in response to receiving the prior transaction identifier, determining whether the prior transaction is identical to a first transaction based on the prior transaction identifier and amending a first transaction record to indicate that the first transaction is a questionable transaction if the prior transaction is determined to be different from the first transaction.

2. The method of claim 1, further comprising:
   communicating with third parties to confirm whether the first transaction was successfully completed; and
   billing a merchant associated with the remote terminal based on whether the first transaction was completed.

3. The method of claim 1, further comprising transmitting a current transaction identifier corresponding to the current transaction from the central processor to the remote terminal.

4. The method of claim 1, wherein the receiving step occurs over at least one of a public switched phone network and a dedicated data channel.

5. The method of claim 1, wherein the receiving step occurs over the internet.

6. The method of claim 1, further comprising:
   prior to the receiving step, transmitting the first transaction identifier from the central processor to a remote terminal.

7. The method of claim 1, wherein the first transaction comprises the distribution of at least one of a PIN and a password to an end user.

8. The method of claim 7, further comprising verifying whether the end user activates the at least one of a PIN and a password.

9. The method of claim 7, further comprising billing a merchant associated with the remote terminal based on whether the end user activates the at least one of a PIN and a password.

10. The method of claim 7, further comprising verifying whether the remote terminal is a trusted source of transaction requests.

11. The method of claim 1, wherein the first transaction comprises a purchase of a product or service associated with at least one of a stored-value card and a PIN.

12. The method of claim 11, wherein the at least one of a stored-value card and a PIN is associated with a gift card.

13. The method of claim 11, wherein the at least one of a stored-value card and a PIN is associated with a prepaid gas card.

14. The method of claim 11, wherein the at least one of a stored-value card and a PIN is associated with a prepaid grocery card.

15. The method of claim 11, wherein the at least one of a stored-value card and a PIN is associated with a prepaid entertainment card.

16. The method of claim 11, wherein the at least one of a stored-value card and a PIN is associated with a downloadable ring tone card.

17. The method of claim 11, wherein the at least one of a stored-value card and a PIN is associated with a downloadable game card.

18. The method of claim 11, wherein the at least one of a stored-value card and a PIN is associated with a downloadable music card.

19. The method of claim 11, wherein the at least one of a stored-value card and a PIN is associated with a downloadable music card that uses MP3, MP4, WMV, or WAV formats.

20. The method of claim 11, wherein the at least one of a stored-value card and a PIN is associated with a customer rewards card.

21. The method of claim 11, wherein the at least one of a stored-value card and a PIN is associated with a telecommunications service.

22. The method of claim 1, wherein the first transaction enables the downloading of software.

23. The method of claim 1, wherein the method of claim 1 subsequently repeats for one or more subsequent transactions.

24. A computer-readable medium encoded with computer program code for reconciling billing requests, the program code causing a computer to execute a method comprising:
receiving at a central processor a request to process a current transaction coupled with prior transaction information corresponding to a prior transaction;
in response to receiving prior transaction information, determining whether the prior transaction is identical to a first transaction based on the prior transaction information and amending a first transaction record to indicate that the first transaction is a questionable transaction if the prior transaction is determined to be different from the first transaction.

25. The computer-readable medium of claim 24, wherein the first transaction comprises the distribution of at least one of a PIN and a password, wherein the at least one of a PIN and a password is associated with a stored-value card.

26. The computer-readable medium of claim 24, wherein the first transaction is a purchase of at least one of a PIN and a password, and the at least one of a PIN and a password is associated with a gift card, a prepaid gas card, a prepaid grocery card, a prepaid entertainment card, a downloadable ring tone card, a downloadable game card, a downloadable music card that uses MP3, MP4, WMV, or WAV formats, or a customer rewards card.

27. A system for confirming transactions processed at a central processor, comprising:
a remote terminal operative to transmit transaction requests and transaction information to a central processor;
a central processor operative to:
receive transaction information and transaction requests from the remote terminal;
in response to receiving transaction information, determine whether transaction information received from the remote terminal corresponds to a last transaction, wherein the last transaction is the most recent transaction for which a transaction identifier was transmitted to the remote terminal and amend one or more stored transaction records if the transaction information received from the remote terminal does not correspond to the last transaction for which a transaction identifier was transmitted to the remote terminal.

28. The system of claim 27, further comprising a billing module operatively connected to the central processor and configured to bill parties for transactions for which associated identifiers received from the remote terminal have been confirmed at the central processor.

29. The system of claim 27, wherein the central processor is further configured to amend transaction identifiers stored at the central database based on information received at the central processor from third parties.

30. The system of claim 27, wherein the central processor is further configured to communicate with third parties to determine whether a transaction was completed.

31. The system of claim 27, wherein each transaction is a purchase of at least one of a PIN and a password, and the at least one of a PIN and a password is associated with a gift card, a prepaid gas card, a prepaid grocery card, a prepaid entertainment card, a downloadable ring tone card, a downloadable game card, a downloadable music card that uses MP3, MP4, WMV, or WAV formats, or a customer rewards card.

32. The system of claim 27, further comprising a communication network between the remote terminal and the central processor.

33. The system of claim 27, further comprising a remote database operatively connected to the remote terminal, wherein the remote database is configured to store transaction information.

34. The system of claim 27, further comprising a central database operatively connected to the central processor, wherein the central database is configured to store transaction records.

35. The method of claim 11, wherein the at least one of a stored-value card and a PIN enables long distance telephone communication.

36. The method of claim 11, wherein the at least one of a stored-value card and a PIN enables wireless communication.

37. The method of claim 11, wherein the at least one of a stored-value card and a PIN enables paging services.

38. The method of claim 11, wherein the at least one of a stored-value card and a PIN enables internet communication services.

39. The method of claim 11, wherein the at least one of a stored-value card and a PIN enables wireless web service.

* * * * *